Oct. 3, 1961 J. R. WRIGHT 3,002,285
LENS TESTING INSTRUMENT
Filed June 2, 1958 3 Sheets-Sheet 1
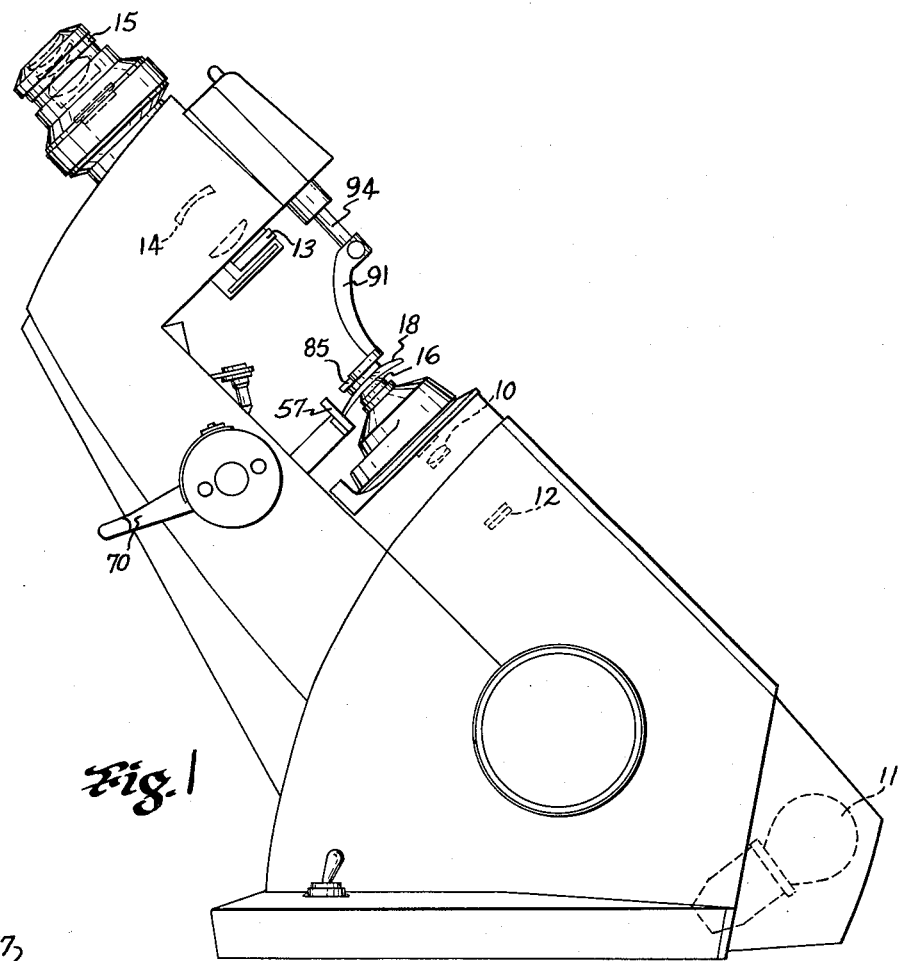
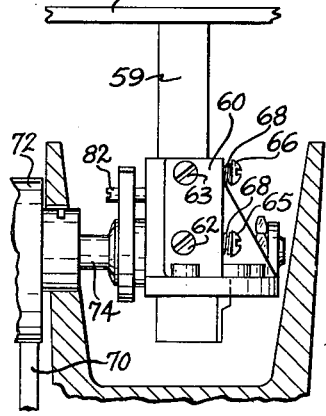
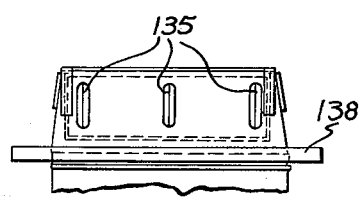
INVENTOR
JOHN R. WRIGHT
BY
Herbert C. Kimball
ATTORNEY

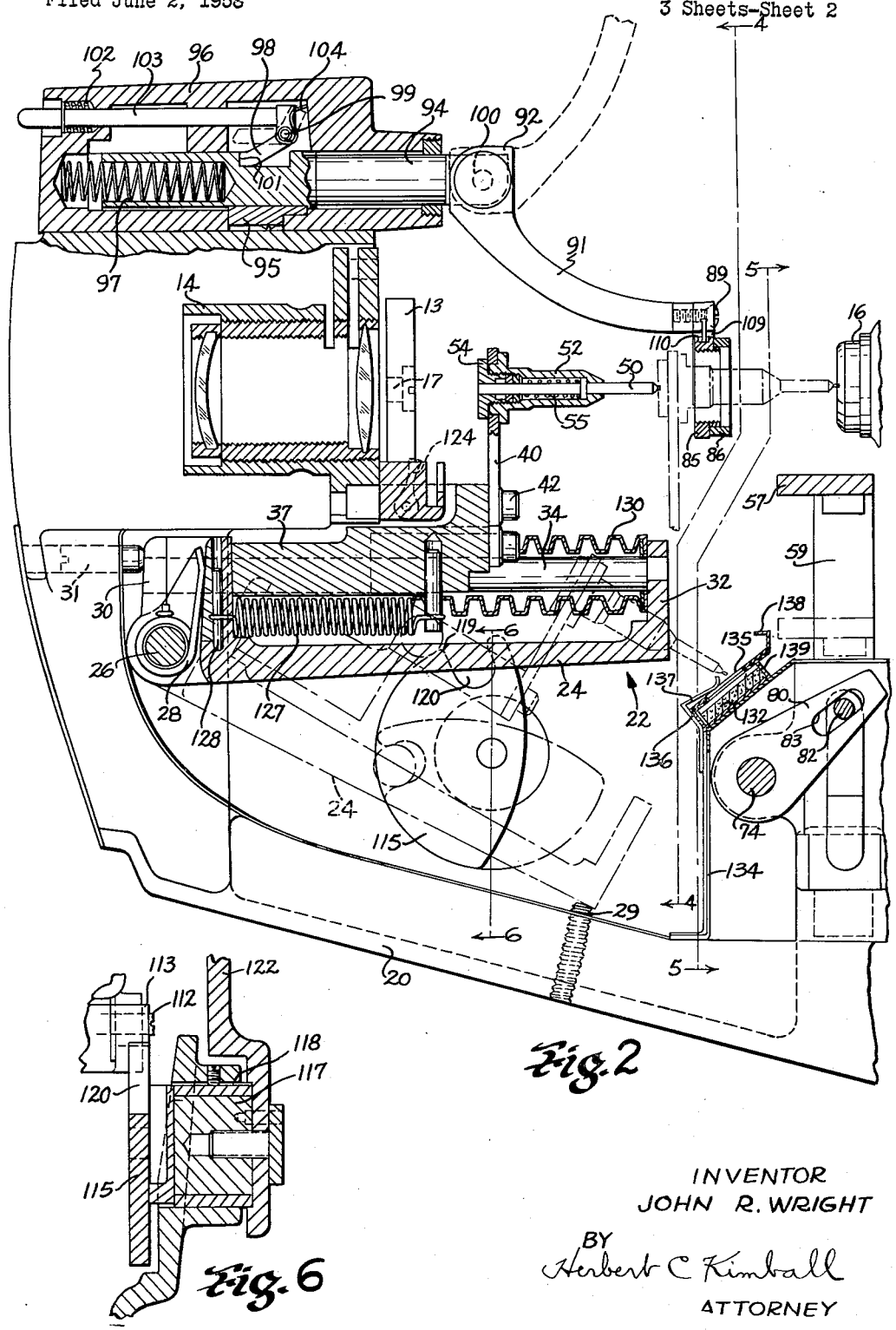

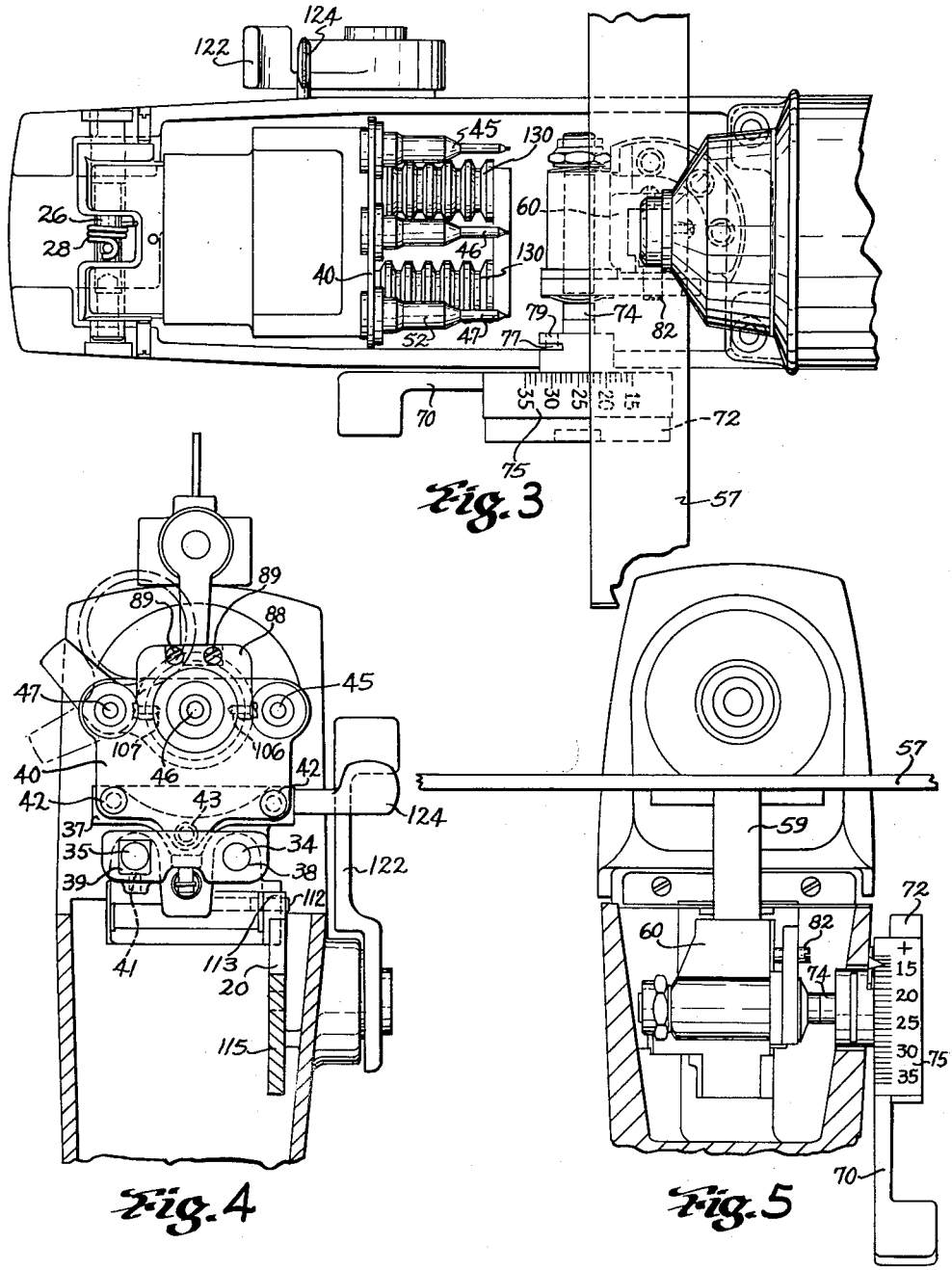

United States Patent Office 3,002,285
Patented Oct. 3, 1961

3,002,285
LENS TESTING INSTRUMENT
John R. Wright, Eggertsville, N.Y., assignor to American Optical Company, Southbridge, Mass., a voluntary association
Filed June 2, 1958, Ser. No. 739,333
7 Claims. (Cl. 33—174)

This invention relates to testing instruments which may be used for determining and marking the optical center of lenses, as well as their focal power and prism power, and the axis of cylindrical power if such be present.

An object of the present invention is to speed up the marking of lenses of varying curves and thicknesses by simplifying the motion of the operator's hand in actuating the marking device, while maintaining accuracy in marking the optical center and the like on the lens.

The basic optical principles are well known and are disclosed, for instance, in the Troppman Patent 1,083,-309, issued January 6, 1914. Briefly summarized, the image of a target is projected by the optical system of a collimator, and this image is viewed by means of a telescope which is aligned with the collimator. The image of the target will be in sharp focus at the zero setting of the target if no lens is being tested. To test a lens, it is positioned at the front focal point of the projecting optical system, and when the target has been shifted to be in sharp focus again, the displacement of the target reveals the focal power of the lens. Moreover, the alignment of the optical center of the lens under test with the optical axis of the instrument is made possible by looking in the telescope for any lateral displacement of the image of the target. Further refinements reveal the axis of any cylindrical power and prism power. The present invention relates to the marking of the lens after these observations have been made.

It will be apparent from the above explanation of the principles of operation of the instrument that the optical axis of the instrument should be free of obstructions during the observation of the target by means of the telescope; and for this reason, any marking device should be retractable to a position where it will clear the optical system. This has led in the past to awkward and hence a slower manipulation of the marking device than is desirable. By my improvement, a simple and continuous movement is all that the operator's hand need make to first bring the marking device to a position confronting the lens and then mark the lens; and the reverse movement is equally simple and easy.

In the drawings which illustrate my invention:

FIG. 1 is a view in side elevation of a lens testing instrument whose construction embodies my invention;

FIG. 2 is a view principally in central vertical section through that portion of the instrument including the telescope, the lens supporting means and the marking device;

FIG. 3 is a plan view of the portion of the instrument shown in FIG. 2, but omitting the telescope and the clamp for the lens under test;

FIG. 4 is a vertical sectional view looking toward the marking device and taken on the line 4—4 of FIG. 2;

FIG. 5 is a vertical sectional view looking in the opposite direction from FIG. 4 and taken on the line 5—5 of FIG. 2;

FIG. 6 is a detail view in vertical section through the actuating mechanism for the marking device, and taken on the line 6—6 of FIG. 2;

FIG. 7 is a detail view in elevation showing a portion of the mechanism for raising and lowering the lens support; and FIG. 8 is a plan view of the closure for the ink pad.

In all of the figures except FIG. 1 the optical axis is taken to be horizontal, instead of inclined as in the preferred form of instrument.

For the sake of simplicity, the optical system of the instrument is shown diagrammatically, the means for supporting the lens to be tested and the lens marking device being shown in detail. In the optical system, the collimator 10 is arranged to project an image of a target 12 which is illuminated by a lamp 11. Aligned with the optical axis of the collimator 10 is a telescope 14 for viewing such image. The nosepiece 16, against which the lens 18 to be tested is held or clamped, is arranged so that the lens 18 is thus positioned at the front focal point of the collimator 10. The use of a filter of desired color, shown at 13 in FIG. 2, is optional, as this filter may be swung about a pivot 17 into or out of the optical path of the lens system.

With no lens positioned at the nosepiece 16 and the target 12 at zero setting, the image of the target will be in sharp focus in the telescope 14. When a lens to be tested is inserted in the optical system at the nosepiece 16, the target 12 must be moved axially of the optical system to bring the image thereof again into sharp focus. The direction of such axial movement depends upon whether the lens 18 is positive or negative, and the extent of movement is proportional to the focal power of the lens 18.

The image of the target 12 will remain centered in the eyepiece 15 of the telescope 14 after insertion of the lens 18 only if the optical center of lens 18 is aligned with the optical axis of the optical system of the instrument. Accordingly, this is a method of determining the optical center of lens 18, and after such center has been ascertained it can be marked by a marker reciprocated along the axis into contact with lens 18. As above pointed out, this marker should not be on the axis during such times as the operator is determining the focal power, axis or other attributes of the lens 18. To eliminate the marker from obstructing position during observation of the image of the target, the marking device as a whole is pivoted to swing into and out of operative relation. A single element such as a lever is effective, through intervening actuating mechanism, to swing the marking device as a whole and to reciprocate the marker into contact with lens 18. These two operations take place by one continuous motion of the lever.

Referring to FIG. 2 of the drawings, the marking device as a whole is indicated by the numeral 22. The bed 24 of the marking device is mounted to pivot about the axle 26 carried by the main frame 20 of the instrument. A coil spring 28 wound about the axle 26 biases the pivoted bed 24 toward the retracted position shown in broken lines in FIG. 2, and a stop screw 29 in the main frame 20 may be set at the proper position to limit the lowermost position of the bed 24. The stop screw 31 similarly limits the raised position (shown in full lines in FIG. 2) of the bed 24.

Between the head 30 of the bed 24 and the upturned foot 32 extend two round rods 34 and 35 along which the marker carriage may be reciprocated. As is apparent from FIG. 4, the carriage 37 for the marker provides a round bearing 38 for sliding on rod 34 and a square bearing 39 for sliding on rod 35. A take-up screw 41 bears against the bottom of rod 35 to avoid lifting of the left side (as seen in FIG. 4) of the carriage 37 by a turning movement about the rod 34. The combination of the bearings 38 and 39 with the two rods 34 and 35 provides a kinematic mounting or track for the carriage 37, in that the carriage follows accurately the rod 34 and only the round bearing 34, 38 need be machined to close tolerances in all planes.

On the front end of the carriage 37 a marker bracket 40 is fixed by screws 42 and 43. The marker carried by the bracket 40 may place one or a plurality of marks on the lens 18. In the illustrative embodiment shown in the present application, the marker is made up of three pens 45, 46 and 47. Each pen, of which one is shown in section in FIG. 2, is made up of a spring pressed point 50 reciprocable within a housing 52 which is carried by the bracket 40. The housing 52 is held tight to the bracket 40 by a nipple 54 threaded within the housing 52 and surrounding the rear end of the point 50. By removing the nipple 54, the spring 55 which biases the point 50 may be replaced.

Thus far it has been assumed that a lens 18 is supported at the front focal point of the collimator 10, and before describing in detail the actuation of the marking device to mark a lens, a description will be given of the lens supporting means. A lens rest or table 57 is mounted at the upper end of a vertically movable column 59 which is guided in its vertical movements by bearing 60 conforming fairly closely to the square contour of the column 59. The expensive machining operation of fitting the column 59 to its bearing 60 within close tolerances is avoided by the use of spaced nylon take-up screws 62 and 63 which engage one face of the column 59 and spaced nylon take-up screws 65 and 66 which engage a face at right angles to the first mentioned face of the column 59. A spring 68 about the shank of each of these nylon take-up screws puts a tensile force on the screw so that they will not back out. The effect of these take-up screws which bear against two sides of the column 59 is to force the column to bear against two sides only of the bearing 60, thus eliminating backlash in an inexpensive way. In addition the nylon screws are a frictional drag which resists movement of the column 59 and tends to keep it in a position to which it has been adjusted.

Such adjustment of the column 59 is under the control of a lever 70 secured to the knob 72 on the end of a rock shaft 74. The knob 72 carries a scale 75 for indicating the setting of the lens rest 57. In order that the scale 75 may accurately indicate the height of the table or lens rest 57, the knob 72 is rotatable on the rock shaft 74, provided the set screw 77, which extends through a bendable portion 79 of the knob 72, is relieved. After accurately setting the knob 72 on the shaft 74, the set screw 77 is driven against the main body of the knob 72 so as to distort the portion 79 and lock the knob 72 on the shaft 74. If the lever 70 is now pushed down, the slotted arm 80 (FIG. 2) which is secured to the rock shaft 74 adjacent the column 59, is raised carrying with it a pin 82 extending outwardly from the column 59 into the slot 83 in arm 80. Accordingly the column 59 is raised, along with the table 57, to a position as indicated on the scale 75. If the lever 70 is raised, the table 57 is lowered. Thus the lever 70 helps the operator to center the lens 18.

The operator may clamp the lens 18 against the nosepiece 16 by a ring 85 carrying an inlay 86 of cushioning material such as rubber. The ring 85 is loosely held by a yoke member 88 fixed by screws 89 to the bifurcated front end of an arm 91 whose rear end 92 is pivotally mounted on a spring pressed plunger 94. A key 95 secured within the supplemental housing 96 guides the shaft and keeps it from rotating. A coil spring 97 tends to thrust the plunger 94 forwardly and carry the ring 85 into holding engagement with a lens 18 resting against the nosepiece 16. A latch 98, pivoted in the housing 96 at 99 has a flat end 101 for engaging in a recess in the plunger 94. The pivot 99 is so arranged that the latch 98 acts as a ratchet and locks the plunger 94 in retracted position unless the end 101 is disengaged (by shoving push rod 103 forwardly until latch 98 is in the dotted line position) after the operator has first drawn the arm 91 rearwardly to allow disengagement of the flat end 101 from its recess in plunger 94. A spring 104 tends to move the latch toward full line position, so that when the operator withdraws the arm 91 to release a lens 18, he may automatically latch the arm 91 in retracted position. The plunger is locked by the flat end of the latch 98, so that this latch will not release unless the operator pulls back on the arm 91 and simultaneously pushes the push rod 103 forwardly. After release of push rod 103, it is retracted rearwardly by the action of spring 102. When it is desirable to clamp and unclamp a lens 18 with one hand, the index finger can be used to pull on arm 91 at the same time that the thumb is used to push rod 103. This leaves the operator's other hand free to position the lens 18 against the nosepiece 16.

Arm 91 is mounted so as to swing upwardly about its pivot or bearing 100 to an elevated position. This allows the operator freedom to hold lenses of unusual thickness, curves or shapes against the nosepiece 16 by hand during examination.

The loose connection between the ring 85 and the yoke member 88 permits the ring 85 to adjust its plane slightly to conform to the lens 18. Toward this desired flexibility, the yoke member 88 has opposed inwardly projecting pintles 106, 107 on which the ring 85 may rock and adjust its plane. A pin 109 depends from the top part of the yoke member 88 so as to engage loosely in a slot 110 in the ring 85 (see FIG. 2) and prevent more than a slight tilting movement.

While the operator is sighting through the eyepiece 15 of the telescope 14 to determine the focal power or to determine the optical center of a lens 18 held against the nosepiece 16 by the clamp ring 85, the marking device 22 is in the retracted position shown in FIG. 2 in broken lines. From the far side of bed 24 (as viewed in FIG. 2) extends a bearing pin 112 carrying an antifriction roller 113. This roller 113 is engaged by a cam 115 which is mounted on a rotatable bearing member 117 journaled in a bearing 118 set into the main frame 20 of the instrument. Somewhat less than half of the periphery of the cam 115 is circular with its center at the axis of rotation of the bearing member 117. This circular segment of the cam has adjacent its leading end 119 a recess 120 which receives the roller 113 while the marking device is in retracted position. This end 119 is called the leading end because the camming action starts with the roller at this end and in the recess 120, when the operator starts to turn the bearing member 117 by means of the lever arm 122. During such turning movement and until the bed 24 approaches its elevated position, the roller 113 remains at least partly in the recess 120. Then as the turning or rather pushing of the lever arm 122 forwardly continues, the roller 113 rides up over the leading end 119 and onto the circular periphery of the cam 115; and at the same time the upper portion of the lever arm 122 engages the pusher 124 on the carriage 37 and bodily moves the carriage 37 forwardly along the rods 34, 35. It will be apparent from this that the motion of the operator's hand when he desires to mark the lens is a remarkably simple one, in that he engages the lever arm 122 and with one continuous thrust accomplishes the marking operation. There is no discontinuity at the time the rise of the bed 24 is accomplished and forward travel of the carriage 37 toward the lens 18 begins. The riding of the roller 113 on the circular periphery of the cam constitutes a lost motion connection between the bed 24 and the mechanism which elevates it from retracted position, so that there is a dwell of the bed in operative position while the marking pens 45, 46 and 47 are thrust forward with the carriage 37 to the broken line position shown in FIG. 2 to mark the lens.

A spring 127 is anchored at its rear end to a pin 128 in the bed 24. This spring retracts the carriage 37 and in conjunction with spring 28 automatically returns the marking device to fully retracted position should the operator relieve his forward pressure on the lever arm 122. A bellows covering 130 for each rod 34, 35 protects the latter against accumulation of dust and dirt.

Inking of the pens 45, 46 and 47 is accomplished with the marking device in retracted position. At this time the pens are opposite an ink pad 132 inserted under a clip in a cover or apron 134. The operator gives a slight thrust to the pusher 124 against the tension of spring 127. Pens 45, 46 and 47 go through slits 135 in a closure 136 (see FIG. 8) made of rubber or of rubber-like plastic material which overlies the ink pad 132. The pens are pushed far enough through the slits 135 to pick up ink from the pad 132, and upon release of the pusher 124 by the operator, the pens are automatically retracted to their initial position and the marking device is ready for operation.

Pad 132 is contained in a liquid proof case 139, the closure 136 acting to prevent the ink from drying out. The closure 136 is pressed against the open top of case 139 by the action of clip 137 on the cover 138, thus effectively sealing in the liquid contained in pad 132 and making it last longer. The closure 136 also acts as a scraper to remove excess ink from the pens.

If the operator desires to mark with only a single point or to mark with a different color from that of the ink in pad 132, he does not press the pusher 124 forward. Instead, he applies the desired ink by hand to the selected point or points when in raised position and before the forward thrust to mark the lens.

The advantage of my invention from the point of view of speeding up the marking of lenses will be readily apparent. The operator does not need to learn a complex set of movements which will awkwardly bring the inking point or points into contact with the lens. The operation of the lens marking device in accordance with my invention is very simple. The operator thrusts forward the lever arm 122. That is all there is to it, and the continuous movement of the operator's hand results in first bringing the bed 24 into operative position and in then thrusting the pens forwardly into contact with the lens. This thrust is in direction parallel to the optical axis of the lens system, and in general is normal to the lens being tested.

I claim:

1. In a lens testing instrument of the type having a telescope aligned with a collimator, the telescope serving for viewing the image of a target projected by the optical system of the collimator, a lens marking device comprising a bed carrying a track, said bed being movable from a retracted position to an operative position and vice versa, said track in the operative position of said bed extending substantially parallel to the optical axis of said optical system, a marker carriage reciprocable along said track, a marker in a cushion mounting on said carriage for yieldably contacting and marking a lens under test, and actuating mechanism engageable first with said bed for moving said bed to operative position and engageable with said marker carriage after said bed is in operative position for reciprocating said marker carriage along said track to bring said marker into contact with said lens, said actuating mechanism including a manually operable element having a continuous movement for accomplishment of said movement of the bed to operative position and said movement of the marker carriage successively.

2. In a lens testing instrument of the type having a telescope aligned with a collimator, the telescope serving for viewing the image of a target projected by the optical system of the collimator, a lens marking device comprising a bed carrying a guide rail, said bed being movable from a retracted position to an operative position and vice versa, said guide rail in the operative position of said bed extending substantially parallel to the optical axis of said optical system, a marker carriage reciprocable along said guide rail, a marker in a cushion mounting on said carriage for contacting and marking a lens under test, said mounting including a spring permitting said marker to yield upon contacting the lens under test, and actuating mechanism for moving said bed to operative position and for moving said marker carriage relative to said bed to bring said marker into contact with said lens during dwell of said bed in said operative position, said actuating mechanism including a manually operable element having continuous movement for accomplishing successively the movement of said bed to operative position and the relative movement of said marker carriage during dwell of said bed in operative position.

3. In a testing instrument for lenses of the type having a telescope aligned with a collimator, the telescope serving for viewing the image of a target projected by the optical system of the collimator, a lens marking device movable from a retracted position to an operative position and vice versa, said device comprising a bed pivotally mounted in said instrument for swinging about a transverse axis and having a track positioned when the device is in operative position substantially parallel to the optical axis of said optical system, a marker carriage reciprocable relative to said bed along said track and mounting a marker for contacting a lens on said lens support, said marker being spring pressed in its said mounting to yield upon contacting a lens, and actuating mechanism for successively swinging said bed to operative position and moving said marker carriage along said track to bring said marker into contact with said lens, said actuating mechanism including an element operable by the user of the instrument for accomplishment of said swinging and reciprocating operations by a continuous movement of said element.

4. In a lens testing instrument of the type having a telescope aligned with a collimator, the telescope serving for viewing the image of a target projected by the optical system of the collimator, a lens marking device movable from a retracted position to an operative position comprising a bed pivotally mounted in said instrument for swinging from one of said positions to the other and having a track substantially parallel, when in operative position, to the optical axis of said optical system, a marker carriage reciprocable relative to said bed along said track and mounting a marker for contacting a lens under test, said marker being spring pressed in its mounting for yielding upon being reciprocated into contact with a lens, a first actuating member for moving said bed to said operative position, a second actuating member for reciprocating said marker carriage to bring said marker into contact with the lens under test, and a manually operable element for operating both said first actuating member and said second actuating member and having a lost-motion connection with the first actuating member to bring about dwell of the bed in said operative position during reciprocation of the marker into contact with the lens under test.

5. In a lens testing instrument of the type having a telescope aligned with a collimator, the telescope serving for viewing the image of a target projected by the optical system of the collimator, a lens marking device comprising a bed pivotally mounted in said instrument on a transverse axis for swinging from a retracted position to an operative position and vice versa and having a guide rail extending substantially parallel, when in operative position, with the optical axis of said optical system, a marker carriage reciprocable along said guide rail and mounting a marker for contacting a lens under test, the mounting of said marker in said carriage including a spring yieldable upon contact between said marker and a lens under test, a rotatable actuating member for swinging said bed to operative position and for retaining said bed in operative position during further rotation of said actuating member, and a manually operable element for rotating said actuating member and for reciprocating said marker carriage after said mount is in operative position.

6. In a lens testing instrument of the type having a telescope aligned with a collimator, the telescope serving for viewing the image of a target projected by the optical system of the collimator, a lens marking device comprising a bed pivotally mounted in said instrument for swinging from a retracted position to an operative position and vice versa and having a track substantially parallel, when in operative position, to the optical axis of said optical system, a marker carriage reciprocable along said track and mounting a marker for contacting a lens under test, said marker being spring pressed in its mounting for yielding upon being reciprocated into contact with a lens, said marker carriage carrying a pusher, a rotatable cam having a portion for swinging said bed to operative position and an adjacent portion for maintaining said bed in operative position, and a manually operable element for rotating said cam and for engaging said pusher to reciprocate said marker carriage after said bed has been moved by said cam to operative position.

7. In a lens testing instrument of the type having a telescope aligned with a collimator, the telescope serving for viewing the image of a target projected by the optical system of the collimator, a lens marking device including a marker, guide means for guiding said marker into marking contact with a lens to be tested, and means for reciprocating said marker along said guide means into contact with said test lens, and means for positioning said test lens during marking comprising a lens rest having an opening permitting viewing of said image through said telescope, an annular member carried by a spring pressed plunger and biased thereby against a test lens positioned by said lens rest, said annular member being positioned to surround the optical axis of the collimator, and a latch for locking said plunger in retracted position, said latch comprising a pivoted ratchet and an unlocking element movable in the direction of retraction of said plunger for releasing said ratchet from said plunger.

References Cited in the file of this patent

UNITED STATES PATENTS

| | | |
|---|---|---|
| Re. 18,569 | McCabe | Aug. 16, 1932 |
| 1,047,000 | De Zeng | Dec. 10, 1912 |
| 1,513,842 | Maynard | Nov. 4, 1924 |
| 1,609,895 | Troppman | Dec. 7, 1926 |
| 1,721,161 | Maynard | July 16, 1929 |
| 1,958,275 | McCabe | May 8, 1934 |
| 2,146,599 | Smith | Feb. 7, 1939 |
| 2,290,566 | Lockhart | July 21, 1942 |
| 2,604,697 | Aulin | July 29, 1952 |
| 2,723,594 | Lueck | Nov. 15, 1955 |

FOREIGN PATENTS

| | | |
|---|---|---|
| 595,562 | Great Britain | Dec. 9, 1947 |

OTHER REFERENCES

B & L Pamphlet, New and Improved Bausch & Lomb Vertometer (C–500, 15, II–49). Published by Bausch & Lomb Optical Co., Rochester, N.Y., four pages.